United States Patent
Ting et al.

(10) Patent No.: US 9,978,340 B2
(45) Date of Patent: May 22, 2018

(54) TOUCH COMMUNICATIONS DEVICE FOR PERFORMING TOUCH COMMUNICATIONS

(71) Applicant: MEDIATEK INC., Hsin-Chu (TW)

(72) Inventors: Shang-Lun Ting, Taipei (TW); Wan-Chun Liao, Taipei (TW); Tzu-Wen Chang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 79 days.

(21) Appl. No.: 14/650,575

(22) PCT Filed: Nov. 14, 2014

(86) PCT No.: PCT/CN2014/091153
§ 371 (c)(1),
(2) Date: Jun. 9, 2015

(87) PCT Pub. No.: WO2015/070805
PCT Pub. Date: May 21, 2015

(65) Prior Publication Data
US 2015/0325209 A1 Nov. 12, 2015

Related U.S. Application Data

(60) Provisional application No. 61/904,514, filed on Nov. 15, 2013.

(51) Int. Cl.
*G06F 3/041* (2006.01)
*G09G 5/12* (2006.01)
(Continued)

(52) U.S. Cl.
CPC .............. *G09G 5/12* (2013.01); *G06F 3/044* (2013.01); *G06F 3/0412* (2013.01);
(Continued)

(58) Field of Classification Search
CPC ........ G09G 5/12; G06F 3/044; H04B 5/0087; H04B 5/0031; H04M 2250/22; H04W 4/008
(Continued)

(56) References Cited

U.S. PATENT DOCUMENTS 8,228,303 B2 7/2012 Naruse
2008/0227404 A1* 9/2008 Harel .................. H04B 7/0632
455/69

(Continued)

FOREIGN PATENT DOCUMENTS

CN 102819346 A 12/2012
CN 102916729 A 2/2013

OTHER PUBLICATIONS

"International Search Report" dated Feb. 17, 2015 for International application No. PCT/CN2014/091153, International filing date:Nov. 14, 2014.

*Primary Examiner* — Yuzhen Shen
(74) *Attorney, Agent, or Firm* — Han IP Corporation; Andy M. Han

(57) ABSTRACT

A touch communications device includes a first touch panel and a processor. The first touch panel includes a first region and a second region. The processor is arranged to control the first region and/or the second region to transmit a signal when a second touch panel of another touch communications device is close to or in contact with the first touch panel.

13 Claims, 12 Drawing Sheets

(51) Int. Cl.
*G06F 3/147* (2006.01)
*G06F 3/044* (2006.01)

(52) U.S. Cl.
CPC ............ *G06F 3/0416* (2013.01); *G06F 3/147* (2013.01); *G09G 2370/06* (2013.01); *G09G 2370/16* (2013.01); *G09G 2370/22* (2013.01)

(58) Field of Classification Search
USPC ......................................... 345/173; 455/41.1
See application file for complete search history.

(56) References Cited

U.S. PATENT DOCUMENTS

| | | | |
|---|---|---|---|
| 2009/0251339 A1* | 10/2009 | Naruse | G06F 1/1626 341/33 |
| 2012/0139865 A1* | 6/2012 | Krah | G06F 3/044 345/174 |
| 2013/0162594 A1 | 6/2013 | Paulsen | |
| 2014/0198012 A1* | 7/2014 | Tseng | H01Q 21/28 343/876 |
| 2014/0199944 A1 | 7/2014 | Ran | |
| 2014/0340325 A1* | 11/2014 | Fang | G06F 3/0416 345/173 |
| 2015/0022081 A1 | 1/2015 | Li | |

\* cited by examiner

TOUCH COMMUNICATIONS DEVICE FOR PERFORMING TOUCH COMMUNICATIONS

CROSS REFERENCE TO RELATED APPLICATIONS

This application claims the benefit of U.S. Provisional Application No. 61/904,514, which was filed on Nov. 15, 2013, and is included herein by reference.

FIELD OF INVENTION

The present invention relates to touch communications technologies applied to electronic devices, and more particularly, to a method for performing touch communications control of an electronic device, and an associated apparatus.

BACKGROUND OF THE INVENTION

According to the related art, Near Field Communication (NFC) can be regarded as a contactless identification and interaction technology, and can be used for performing short distance wireless communications between mobile devices, consumer electronic products, personal computers, and/or intelligent electronic devices through a method of near field magnetic coupling (e.g. using the frequency of 13.56 MHz). The users of NFC devices can intuitively exchange information and acquire contents and services with ease.

As the market for portable electronic devices such as mobile phones equipped with NFC functionalities has become mature, they can be used for supporting mobile payment or point of sale (POS). However, as the NFC devices are designed to transmit and receive signals through magnetic coupling, it is typical to implement an inductive card reader or some components having similar functionalities in the aforementioned portable electronic devices such as the mobile phones mentioned above, which may cause the sizes of the portable electronic devices to be increased, and further cause the layouts, the structure arrangement, and the materials of components in the portable electronic devices such as the mobile phones to be limited.

Therefore, some touch communications technologies regarding touch panel devices (e.g. electronic device equipped with touch panels), such as those described in the U.S. Patent Application Publication No. 2011/0304583, the U.S. Patent Application Publication No. US 2013/0147760, the China Patent Application Publication No. CN 102916729 A, are proposed recently, where the touch panels and the driving integrated circuit (IC) in the touch panel devices can be used for performing communications and data transmission. For example, a conventional touch panel device may comprise a touch sensor. In addition, at least one portion of the touch sensor can be at least one portion of the touch panel in the conventional touch panel device, where the touch panel can be a touch panel that does not have the display functionality (e.g. a touch pad), or a touch panel that has the display functionality (e.g. a touch screen). The touch sensor may comprise multiple driving electrodes and sensing electrodes installed on substrates, such as the driving electrodes and the sensing electrodes for forming capacitor structures. At least one of the driving electrodes and the sensing electrodes can be used as transmitting electrodes, and at least one of the driving electrodes and the sensing electrodes can be used as receiving electrodes. Thus, the signals can be transmitted or received by using the electrodes and the driving IC in the conventional touch panel device, to realize touch communications based on electric fields, having no need to implement any inductive card reader or some components having similar functionalities in the conventional touch panel device, where this architecture can significantly reduce the size and save the costs, in comparison with the NFC technology.

Please refer to FIG. 1, which illustrates a diagram of touch communications between a first touch panel device 101 and a second touch panel device 102 according to the related art. As shown in FIG. 1, there are near field electric fields 103a and 103b between the first touch panel device 101 and the second touch panel device 102. It should be noted that each of the first touch panel device 101 and the second touch panel device 102 can have the functionalities of transmitting and receiving signals. Based on this touch communications technology, when the first touch panel device 101 transmits signals toward the second touch panel device 102, the communications medium used by the first touch panel device 101 is the electric field portion whose electric field direction is pointing toward the second touch panel device 102 (e.g. the near electric field 103a shown in FIG. 1). In addition, when the second touch panel device 102 transmits signals toward the first touch panel device 101, the communications medium used by the second touch panel device 102 is the electric field portion whose electric field direction is pointing toward the first touch panel device 101 (e.g. the near electric field 103b shown in FIG. 1). Please note that the X channels and the Y channels shown in FIG. 1 may represent the transmitting electrodes and receiving electrodes installed on substrates, such as the transmitting electrodes and the receiving electrodes for forming capacitor structures.

FIG. 2 is a logical block diagram of a touch communications system for realizing the touch communications between the first touch panel device 101 and the second touch panel device 102 shown in FIG. 1 according to the related art, where the touch communications system may comprise a signal transmitting system 201 and a signal receiving system 202. The first touch panel device 101 shown in FIG. 1 may comprise the signal transmitting system 201 shown in FIG. 2, and the second touch panel device 102 shown in FIG. 1 may comprise the signal receiving system 202 shown in FIG. 2. The signal transmitting system 201 may comprise a touch communications request signal generating unit 211, a communications connection establishment unit 212, and a first communications unit 213. More particularly, the touch communications request signal generating unit 211 may be arranged to generate a touch communications request signal, and to transmit the touch communications request signal to the second touch panel device 102 through the transmitting electrodes of the first touch panel device 101. After the first touch panel device 101 receives a response signal responded by the second touch panel device 102, such as the response signal received through the receiving electrodes of the first touch panel device 101, the communications connection establishment unit 212 may establish a communications connection with the second touch panel device 102 (i.e. the communications connection between the first touch panel device 101 and the second touch panel device 102). After the communications connection establishment unit 212 establishes the communications connection, the first communications unit 213 may transmit communications information and/or data to the second touch panel device 102 through the transmitting electrodes of the first touch panel device 101.

The signal receiving system 202 may comprise a touch communications request signal responding unit 221, a communications connection establishment unit 222, and a second communications unit 223. More particularly, after receiving the touch communications request signal first touch panel device 101, such as the touch communications request signal received through the receiving electrodes of the second touch panel device 102, the touch communications request signal responding unit 221 may respond to the touch communications request signal with a response signal such as that mentioned above, and more particularly, may send the response signal to the first touch panel device 101 through the transmitting electrodes of the second touch panel device 102. After the touch communications request signal responding unit 221 responds to the touch communications request signal of the first touch panel device 101 with the response signal, the communications connection establishment unit 222 may establish the communications connection with the first touch panel device 101 (i.e. the communications connection between the first touch panel device 101 and the second touch panel device 102). After the communications connection establishment unit 222 establishes the communications connection, the second communications unit 223 may receive the communications information and/or data from the first touch panel device 101 through the receiving electrodes of the second touch panel device 102.

FIG. 3 illustrates a first touch panel 301 of the first touch panel device 101 shown in FIG. 1 and a second touch panel 302 of the second touch panel device 102 shown in FIG. 1 according to the related art. As shown in FIG. 3, each touch panel of the first touch panel 301 and the second touch panel 302 may comprise a touch sensor (not completely shown in FIG. 3). For example, the touch sensor of the first touch panel 301 may comprise a set of transmitting electrodes installed on at least one substrate of the first touch panel 301 (e.g. the transmitting electrode 311) for transmitting signals, and may comprise a set of receiving electrodes installed on at least one substrate of the first touch panel 301 (e.g. the receiving electrode 312) for receiving signals. In another example, the touch sensor of the second touch panel 302 may comprise a set of transmitting electrodes installed on at least one substrate of the second touch panel 302 (e.g. the transmitting electrode 321) for transmitting signals, and may comprise a set of receiving electrodes installed on at least one substrate of the second touch panel 302 (e.g. the receiving electrode 322) for receiving signals.

FIG. 4 is a flowchart of a touch communications method according to the related art. First, in Step S401, the touch communications request signal generating unit 211 of the first touch panel device 101 may generate a touch communications request signal such as that mentioned above, and transmit the touch communications request signal to the second touch panel device 102 through the transmitting electrode(s) of the first touch panel device 101. Afterward, in Step S402, the touch communications request signal responding unit 221 of the second touch panel device 102 may respond to the touch communications request signal with a response signal such as that mentioned above through the transmitting electrode(s) of the second touch panel device 102, and more particularly, send the response signal to the first touch panel device 101 through the transmitting electrode(s) of the second touch panel device 102. After the first touch panel device 101 receives the response signal responded by the second touch panel device 102, such as the response signal received through the receiving electrodes of the first touch panel device 101, in Step S403, the communications connection establishment unit 212 of the first touch panel device 101 and the communications connection establishment unit 222 of the second touch panel device 102 may establish a communications connection such as that mentioned above (i.e. the communications connection between the first touch panel device 101 and the second touch panel device 102). As a result, in Step S404, the first touch panel device 101 (more particularly, the first communications unit 213 therein) and the second touch panel device 102 (more particularly, the second communications unit 223 therein) may perform communications as shown in FIG. 4. For example, the first communications unit 213 of the first touch panel device 101 may transmit the communications information and/or data to the second touch panel device 102 through the transmitting electrodes of the first touch panel device 101, and the second communications unit 223 of the second touch panel device 102 may receive the communications information and/or data from the first touch panel device 101 through the receiving electrodes of the second touch panel device 102.

With the need of performing various actions through the above mentioned touch communications technology, there is a need for a novel touch communications device capable of delivering various signals or signal combinations to another touch communications device to trigger various actions to be performed.

SUMMARY OF THE INVENTION

In accordance with exemplary embodiments of the present invention, a touch communications device, a touch communications system and an associated method for performing touch communications are proposed.

According to a first aspect of the present invention, a touch communications device is proposed. The touch communications device includes a first touch panel and a processor. The first touch panel includes a first region and a second region. The processor is arranged to control the first region and/or the second region to transmit a signal when a second touch panel of another touch communications device is close to or in contact with the first touch panel.

According to a second aspect of the present invention, a touch communications device is proposed. The touch communications device includes a first touch panel and a processor. The first touch panel includes a first region and a second region. The processor is arranged to refer to a signal received by the first region and/or the second region when a second touch panel of another touch communications device is close to or in contact with the first touch panel, to perform an action.

According to a third aspect of the present invention, a touch communications device is proposed. The touch communications device includes a first touch panel and a processor. The processor is arranged to control the first touch panel to sequentially transmit a first signal and a second signal when a second touch panel of another touch communications device is close to or in contact with the first touch panel.

According to a fourth aspect of the present invention, a touch communications device is proposed. The touch communications device includes a first touch panel and a processor. The processor is arranged to refer to a receiving sequence of a first signal and a second signal received by the first touch panel when a second touch panel of another touch communications device is close to or in contact with the first touch panel, to perform an action.

These and other objectives of the present invention will no doubt become obvious to those of ordinary skill in the art after reading the following detailed description of the preferred embodiment that is illustrated in the various figures and drawings.

DETAILED DESCRIPTION

Certain terms may be used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" may be used in an open-ended fashion, and thus should be interpreted to mean "include, but not limited to . . . ". Also, the term "couple" may be intended to mean either an indirect or direct electrical connection. Accordingly, if one device is coupled to another device, that connection may be through a direct electrical connection, or through an indirect electrical connection via other devices and connections.

Figure 1:
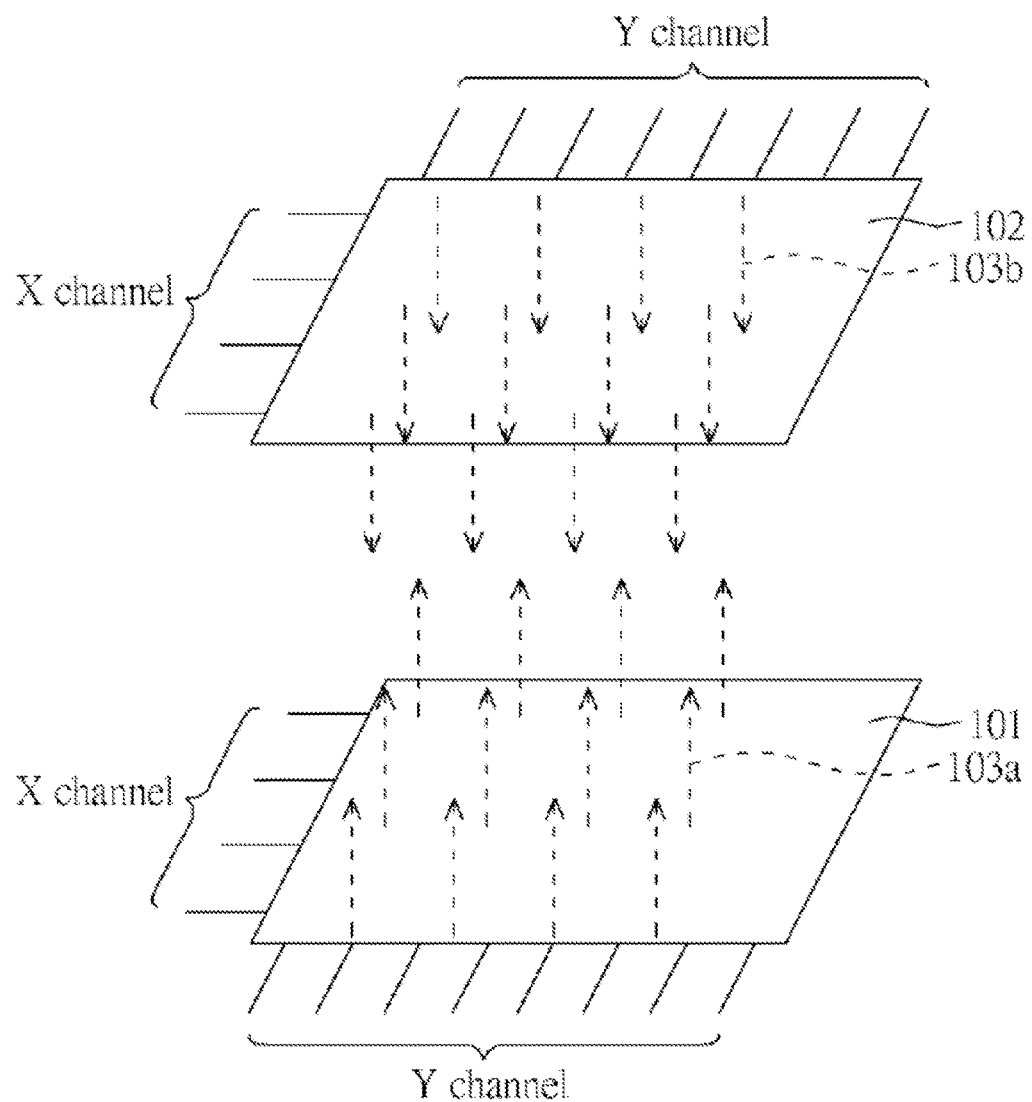
FIG. 1 is a diagram of touch communications between a first touch communications device and a second touch communications device according to the related art.
Figure 2:
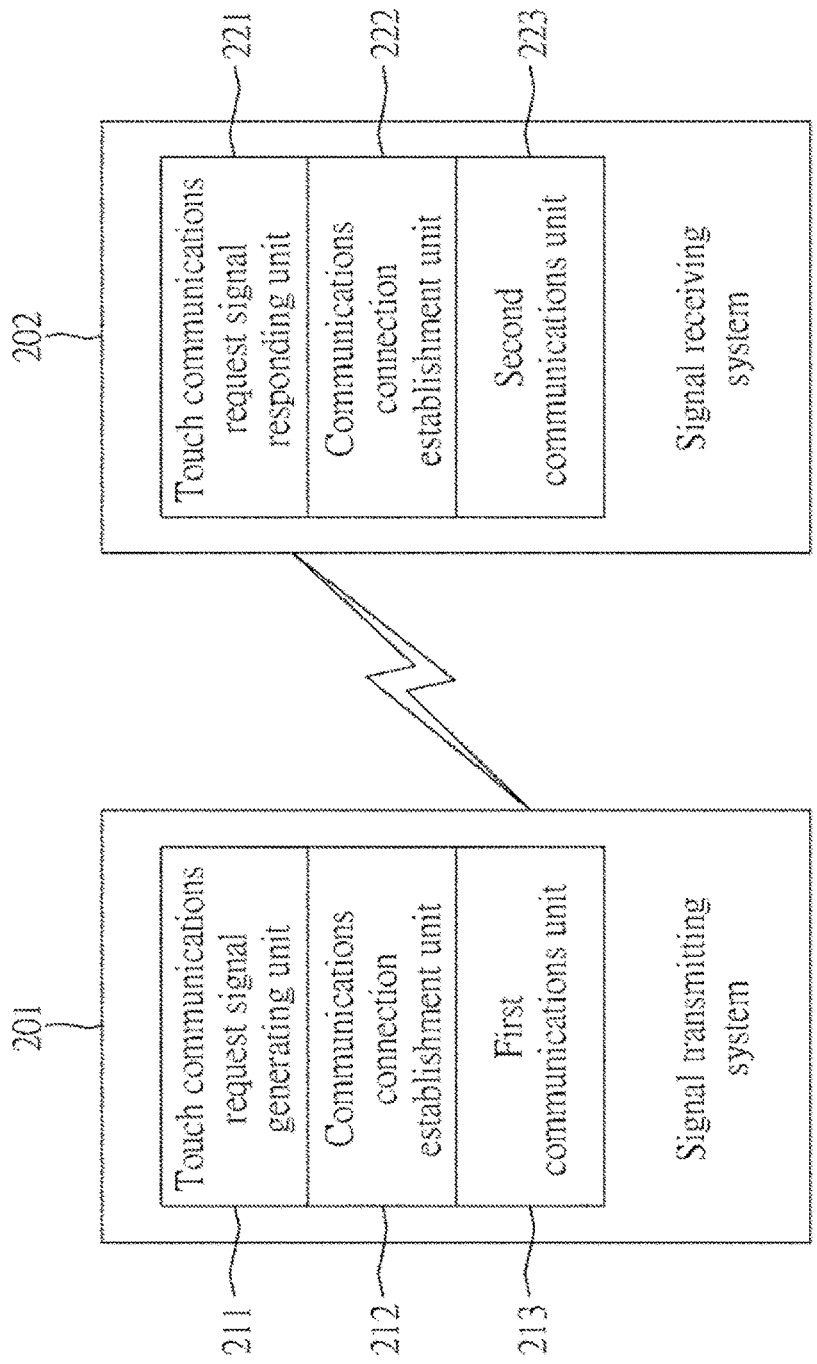
FIG. 2 is a logical block diagram of a touch communications system for realizing the touch communications between the first touch communications device and the second touch communications device shown in FIG. 1 according to the related art.
Figure 3:
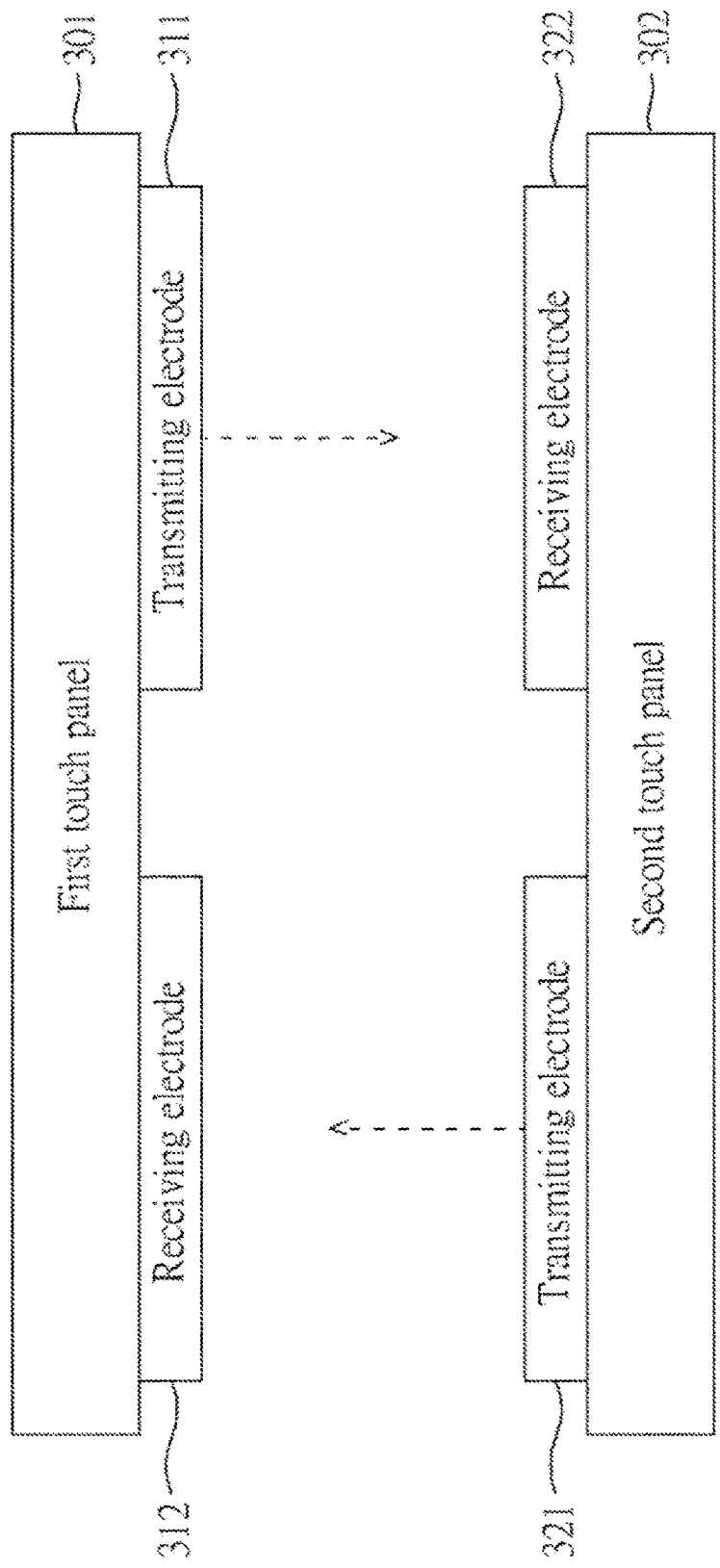
FIG. 3 illustrates a first touch panel of the first touch communications device shown in FIG. 1 and a second touch panel of the second touch communications device shown in FIG. 1 according to the related art.
Figure 4:
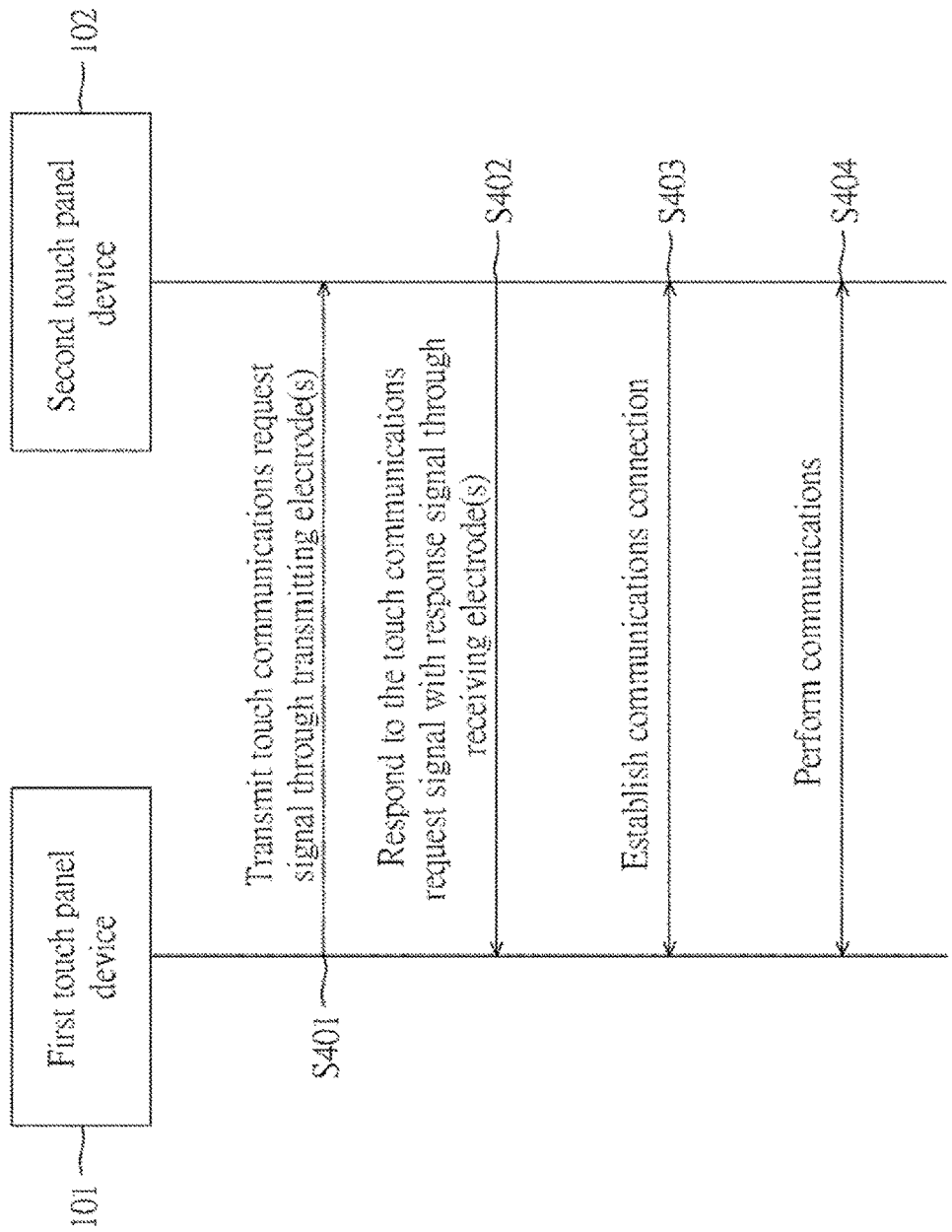
FIG. 4 is a flowchart of a touch communications method according to the related art.
Figure 5:
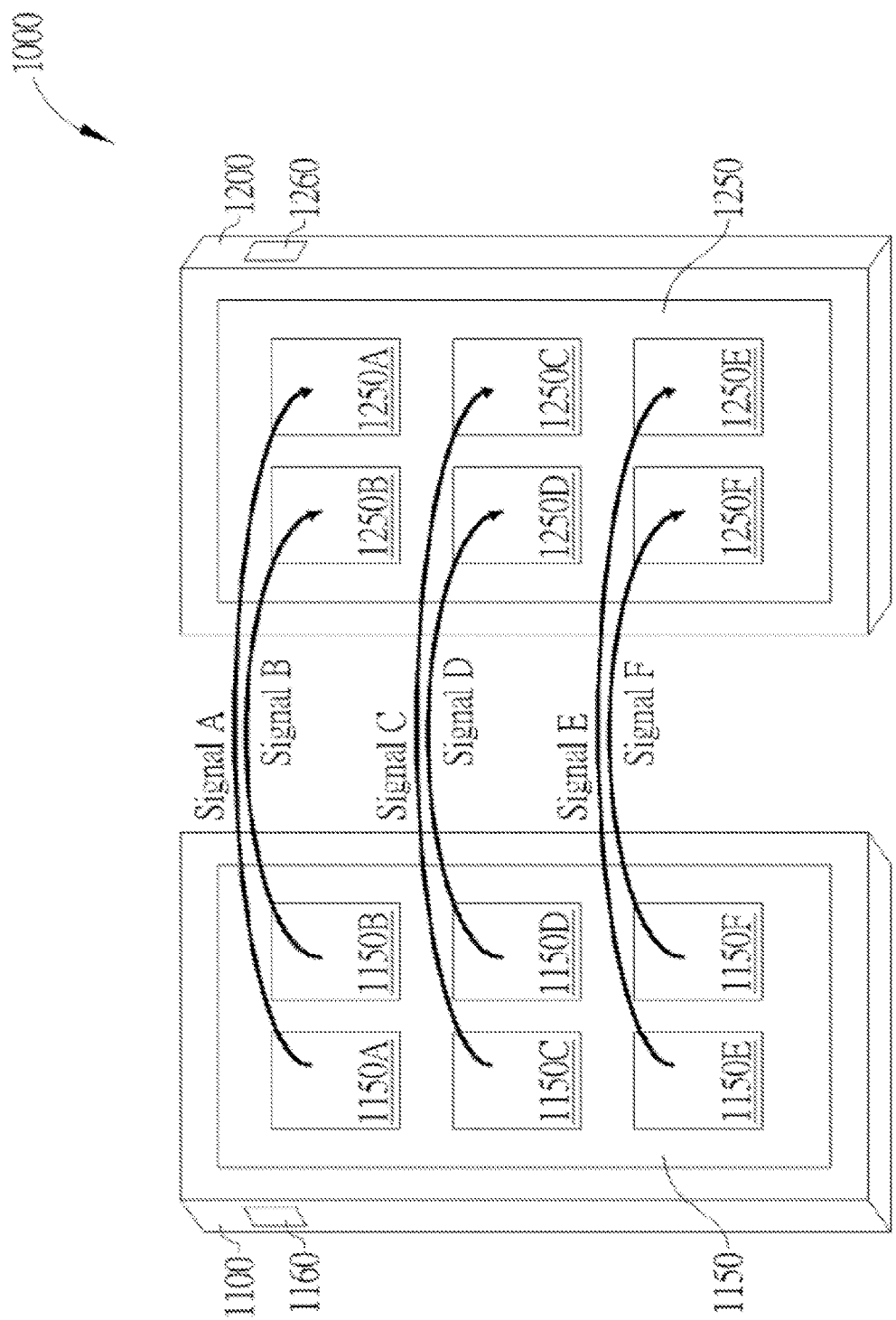
FIG. 5 is a diagram illustrating touch communications performed by a touch communications system according to an exemplary embodiment of the present invention.
Figure 8:
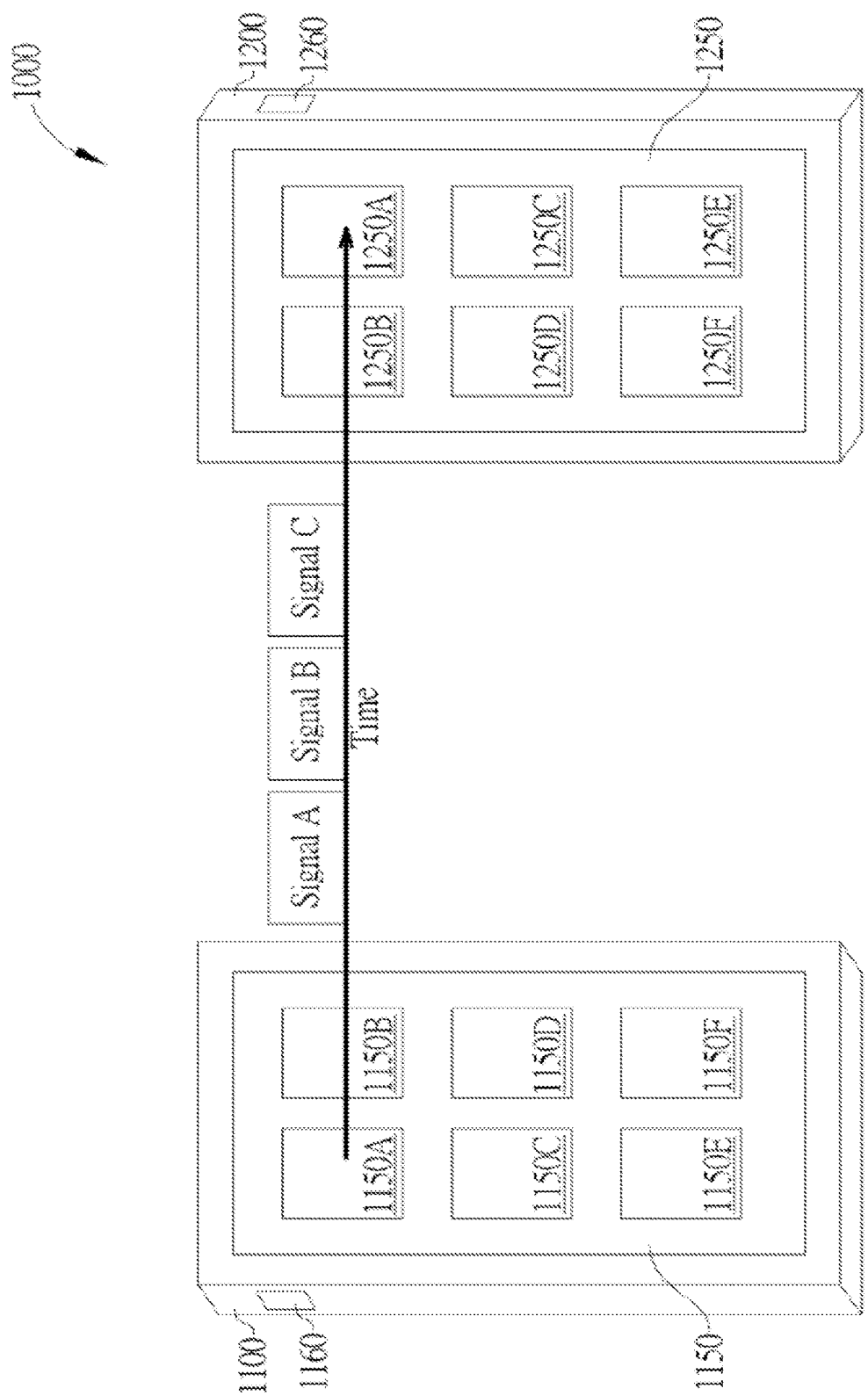
FIG. 8 is a diagram illustrating touch communications performed by a touch communications system according to an exemplary embodiment of the present invention.

FIGS. 5 and 8 are diagrams illustrating touch communications performed by a touch communications system 1000 according to exemplary embodiments of the present invention. The touch communications system 1000 may include two touch communications devices, such as a first touch communications device 1100 and a second touch communications device 1200 shown in FIGS. 5 and 6. By way of example, but not limitation, the first touch communications device 1100 and the second touch communications device 1200 may be a smart phone, a tablet, a wearable device or an electronic device equipped with a touch panel. The first touch communications device 1100 may include a touch panel 1150 and a processor 1160. The touch panel 1150 may include a plurality of regions, e.g. the regions 1150A-1150F. Similarly, the second touch communications device 1200 may include a touch panel 1250 and a processor 1260. Similarly, the touch panel 1250 may include a plurality of regions, e.g. 1250A-1250F. Please note that although each of the touch panels 1150 and 1250 has six regions as shown in FIG. 5, the present invention does not limit the number of regions of each touch panel. Further, the number of regions of the two touch panels may not be limited to be the same. Although the first touch communications device 1100 and the second touch communications device 1200 are illustrated as a transmitting terminal and a receiving terminal in the following paragraphs, respectively, one skilled in the art should understand that the functions of the first touch communications device 1100 and the second touch communications device 1200 can be substantially the same, and the transmitting/receiving states of the first touch communications device 1100 and the second touch communications device 1200 can be inverted.

When the touch panels 1150 and 1250 are close to or in contact with each other, a communications connection may be established between the touch communications devices 1100 and 1200 so that signal(s) can be transmitted between the touch panels 1150 and 1250. The processor 1160 may be arranged to control the touch panel 1150 to transmit at least one signal to the touch panel 1250. For one example, the processor 1160 may be arranged to control the region 1150A and/or the region 1150B to transmit a signal. For another example, the processor 1160 may be arranged to control any region of the touch panel 1150, even the region besides regions 1150A-1150F, to sequentially transmit a first signal and a second signal. In one exemplary embodiment, each of the regions 1150A-1150F can be controlled to transmit or not transmit a signal. The signal(s) may be transmitted before, when, or after the touch panel 1250 of the second touch communications device 1200 is close to or in contact with the touch panel 1150. The processor 1260 may be arranged to refer to at least one signal received by the touch panel 1250 when the touch panel 1250 being close to or in contact with the touch panel 1150, to perform an action. For one example, the processor 1260 may be arranged to refer to a signal received by the region 1250A and/or the region 1250B when the touch panel 1250 being close to or in contact with the touch panel 1150, to perform an action. For another example, the processor 1260 may be arranged to refer to a receiving sequence of a first signal and a second signal received by the touch panel 1250 when the touch panel 1150 is close to or in contact with the touch panel 1250, to perform an action Therefore, the processor 1260 may perform an action based on the signal or the signal combination transmitted by the touch panel 1150 and received by the touch panel 1250. The signal(s) can be transmitted by different regions of touch panel 1150, at different timings, at different frequencies, or a combination thereof.

In one exemplary embodiment, performing an action (or triggering an operation) may include, but not limited to, controlling a device other than the touch communications device 1100, enabling an application, etc. According to some exemplary embodiments, the operations of controlling the device other than the touch communications device 1100 may vary. For example, when the touch panel 1250 receives a first signal, the processor 1260 may control the touch communications device 1200 to turn on a TV and to remotely control the TV to switch to a predetermined channel. In another example, when the touch panel 1250 receives a first signal combination, the processor 1260 may control the touch communications device 1200 to turn on an air condition system. In another example, when the touch panel 1250 receives a second signal, the processor 1260 may control the touch communications device 1200 to turn on an audio playback system and to remotely control the audio playback system to play a predetermined audio program. This is for illustrative purposes only, and is not meant to be a limitation of the present invention. According to some exemplary embodiments, the operations of enabling the application may vary. For example, when the touch panel 1250 receives a first signal, the processor 1260 may run an electronic mail (e-mail) application. In another example, when the touch panel 1250 receives a first signal combination, the processor 1260 may run a web page browser application. In another example, when the touch panel 1250 receives a second signal, the processor 1260 may run a ticket service application. This is for illustrative purposes only, and is not meant to be a limitation of the present invention.

The aforementioned signal combination may be any of a plurality of predetermined/user-defined combinations. In one exemplary embodiment, as depicted in FIG. 5, the region 1250A can be corresponding to the region 1150A, the region 1250B can be corresponding to the region 1150B, the region 1250C can be corresponding to the region 1150C, and so on. This arrangement can be referred to as spatial-domain manner, which can mean that the signal combination can be based on spatial-domain arrangement of signal(s). Although FIG. 5 illustrates that the region 1150A transmits a signal A to the region 1250A, the region 1150B transmits a signal B to the region 1250B, the region 1150C transmits a signal C to the region 1250C, and so on, the region 1150A may transmit any signal(s) other than signal A (or even signal(s) other than signals A-F) or not transmit signal, the region 1150A may transmit any signal(s) other than signal A (or even signal(s) other than signals A-F) or not transmit signal, the region 1150B may transmit any signal(s) other than signal B (or even signal(s) other than signals A-F) or not transmit signal, the region 1150C may transmit any signal(s) other than signal C (or even signal(s) other than signals A-F) or not transmit signal, and so on. In some modifications of this exemplary embodiment, the regions 1150A-1150F may transmit signal(s) to not only its corresponding region of the regions 1250A-1250F, but also any other region of the regions 1250A-1250F. For example, the region 1150A may transmit signal B to the region 1250F. In some exemplary embodiments, the signal(s) may be received by region(s) of touch panel 1250 that is other than the regions 1250A-1250F. In some exemplary embodiments, the signal(s) may be transmitted by region(s) of touch panel 1150 that is other than regions 1150A-1150F.

In this exemplary embodiment, the processor 1260 of the second touch communications device 1200 may be arranged to detect if the signal or signal combination received by the touch panel 1250 conforms to a predetermined signal or signal combination. If the processor 1260 detects that the received signal or signal combination does not conform to the predetermined signal or signal combination, this signal or signal combination may be ignored to prevent operation errors. Further, the signals transmitted between the regions 1150A-1150F of the touch panel 1150 and the regions 1250A-1250F of the touch panel 1250 may be arranged to be orthogonal to each other, to improve the resistivity against signal interference.

Figure 6:
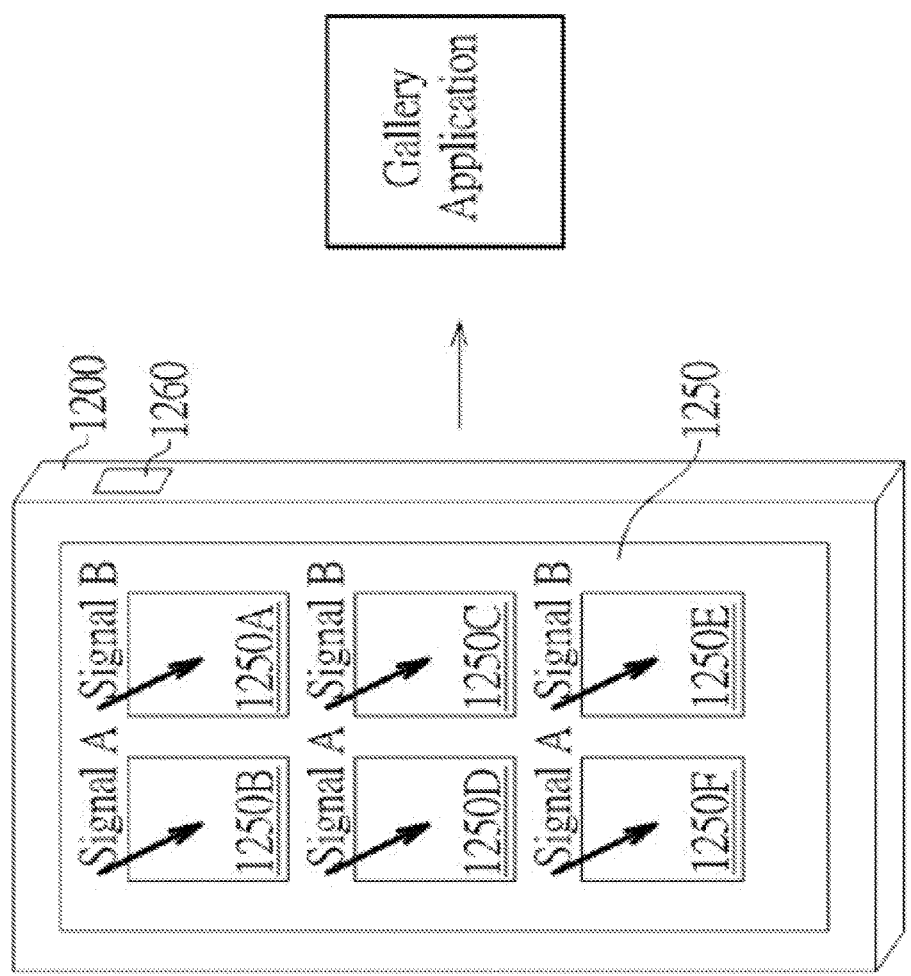
FIGS. 6-7 are diagrams illustrating signal receiving and action performing by a touch communications device according to exemplary embodiments of the present invention.
Figure 7:
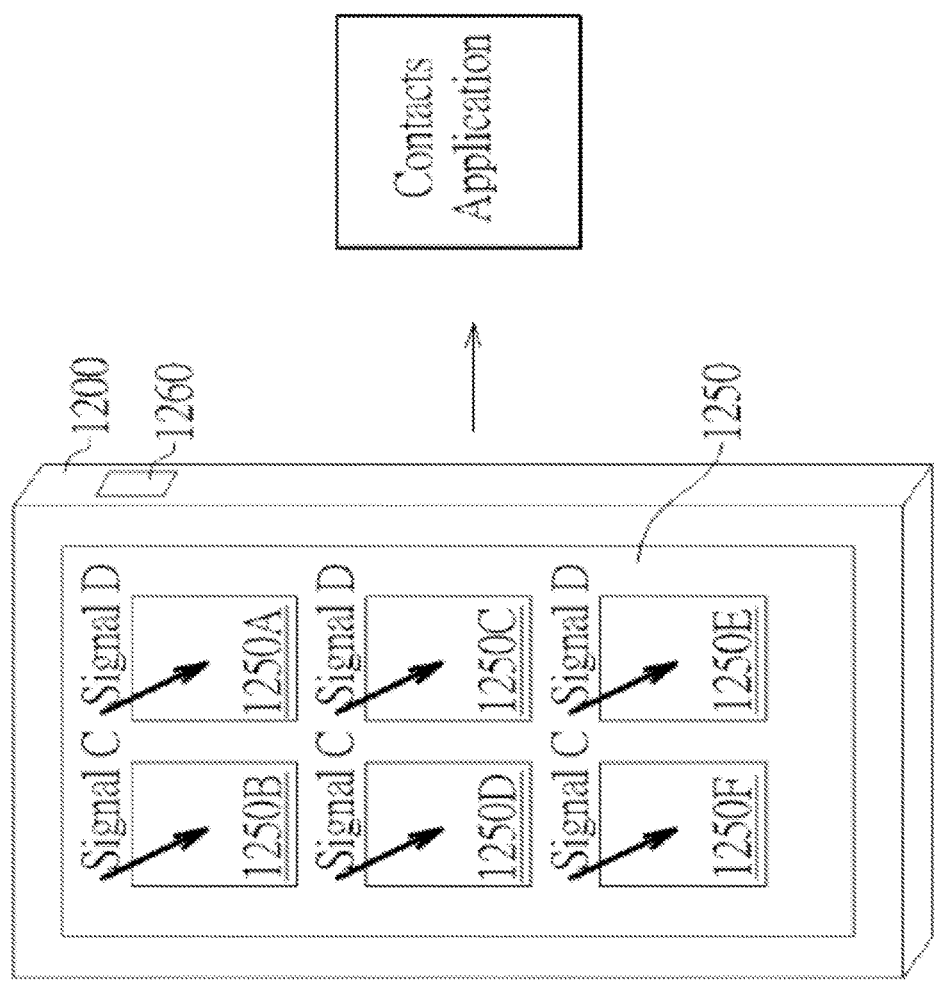

FIGS. 6-7 are diagrams illustrating signal receiving and action performing by a touch communications device according to exemplary embodiments of the present invention. As shown in FIG. 6, the regions 1250A-1250F may respectively receive signal B, signal A, signal B, signal A, signal B and signal A from the touch panel 1150 of the first touch communications device 1100 (not shown), and the signals may form a signal combination. The signals may be transmitted by any region(s) of touch panel 1150, not limited to regions 1150A-1150F. The processor 1260 of the second touch communications device 1200 may refer to the signal combination to perform an action such as enable/initiate a gallery application running on the second touch communications device 1200. Therefore, in this exemplary embodiment, a user may control the second touch communications device 1200 to display a photo or a slideshow by placing the first touch communications device 1100 to be close to or in contact with the second touch communications device 1200.

As shown in FIG. 7, the regions 1250A-1250F may respectively receive signal D, signal C, signal D, signal C, signal D and signal C from the touch panel 1150 of the first touch communications device 1100 (not shown), and the signals may form a signal combination. The signals may be transmitted by any region(s) of touch panel 1150, not limited to regions 1150A-1150F. The processor 1260 of the second touch communications device 1200 may refer to the signal combination to perform an action such as enable/initiate a contacts application running on the second touch communications device 1200. Therefore, a user may control the second touch communications device 1200 to send messages to a people on contact list by placing the first touch communications device 1100 to be close to or in contact with the second touch communications device 1200.

The signal combinations and correspondingly performed actions mentioned above are for illustrative purpose only, and the present invention may not be limited thereto. In some modifications of the present invention, the second touch communications device 1200 may perform other actions according to various signals or signal combinations. In some exemplary embodiments, two regions of one touch panel may receive substantially the same signal (e.g., both of the regions 1250A and 1250B receive the signal A) or different signals (e.g., the region 1250A receives the signal A while the region 1250B receives the signal B), and may receive substantially the same signal combination (e.g., both of the regions 1250A and 1250B sequentially receive the signal A and the signal B) or different signal combinations (e.g., the region 1250A sequentially receives the signal A and the signal B, while the region 1250B sequentially receives the signal C and the signal D). Besides, the number of regions of touch panels 1150 and 1250 and the kinds of signals transmitted by the touch panel 1150 are for illustrative purpose only. Assuming the touch panel 1150 may transmit N−1 kinds of signals or not transmit signal and the touch panel 1250 has m regions to receive the signal(s), then there may be $N^m$ kinds of signal combination to trigger different actions.

Moreover, it may be possible to configure the signals transmitted from the touch panel 1150 of the first touch communications device 1100 to the touch panel 1250 of the second touch communications device 1200 to not have the same frequency. In this way, the signal combination of the signals may include a frequency-domain combination of the signals. The above frequency-domain modulation may be another way to distinguish different signal combinations from each other. In addition, both of the above spatial-domain and frequency-domain can be combined to increase the diversity of the signal combinations.

FIG. 8 is a diagram illustrating touch communications performed by a touch communications system 1000 according to an exemplary embodiment of the present invention. As shown in FIG. 8, the signals A, B and C transmitted from the region 1150A of touch panel 1150 to the region 1250A of the touch panel 1250 are not transmitted at the same time but are sequentially transmitted. In this way, the signal combination of the signals may include different time-domain combinations of the signals, so that different signal combinations can be distinguished from each other. It should be noted that the signal transmitting and receiving shown in FIG. 8 is for illustrative purpose only and is not meant to be a limitation. The signal(s) may be transmitted by any region(s) of the touch panel 1150, even the region(s) other than regions 1150A-1150F. The signal(s) can be received by any region(s) of the touch panel 1250, even the region(s) other than regions 1250A-1250F. The transmitting sequence of the signals can vary; for example, can be signal B-signal A-signal C. The kind(s) of transmitted signal(s) can vary; for example, can be signal A-signal A, signal B-signal A, signal A-signal B-signal C-signal D, etc.

Moreover, it may be possible to configure the signal(s) transmitted from the touch panel 1150 of the first touch communications device 1100 to the touch panel 1250 of the second touch communications device 1200 to not have the same frequency. In this way, the signal combination of the signals may include a frequency-domain combination of the signals. The above frequency-domain modulation may be another way to distinguish different signal combinations from each other. In addition, both of the above time-domain and frequency-domain can be combined to increase the diversity of the signal combinations.

The processor 1260 of the second touch communications device 1200 may be arranged to refer to a receiving sequence of the signal(s) received by the touch panel 1250, to perform an action.

Figure 9:
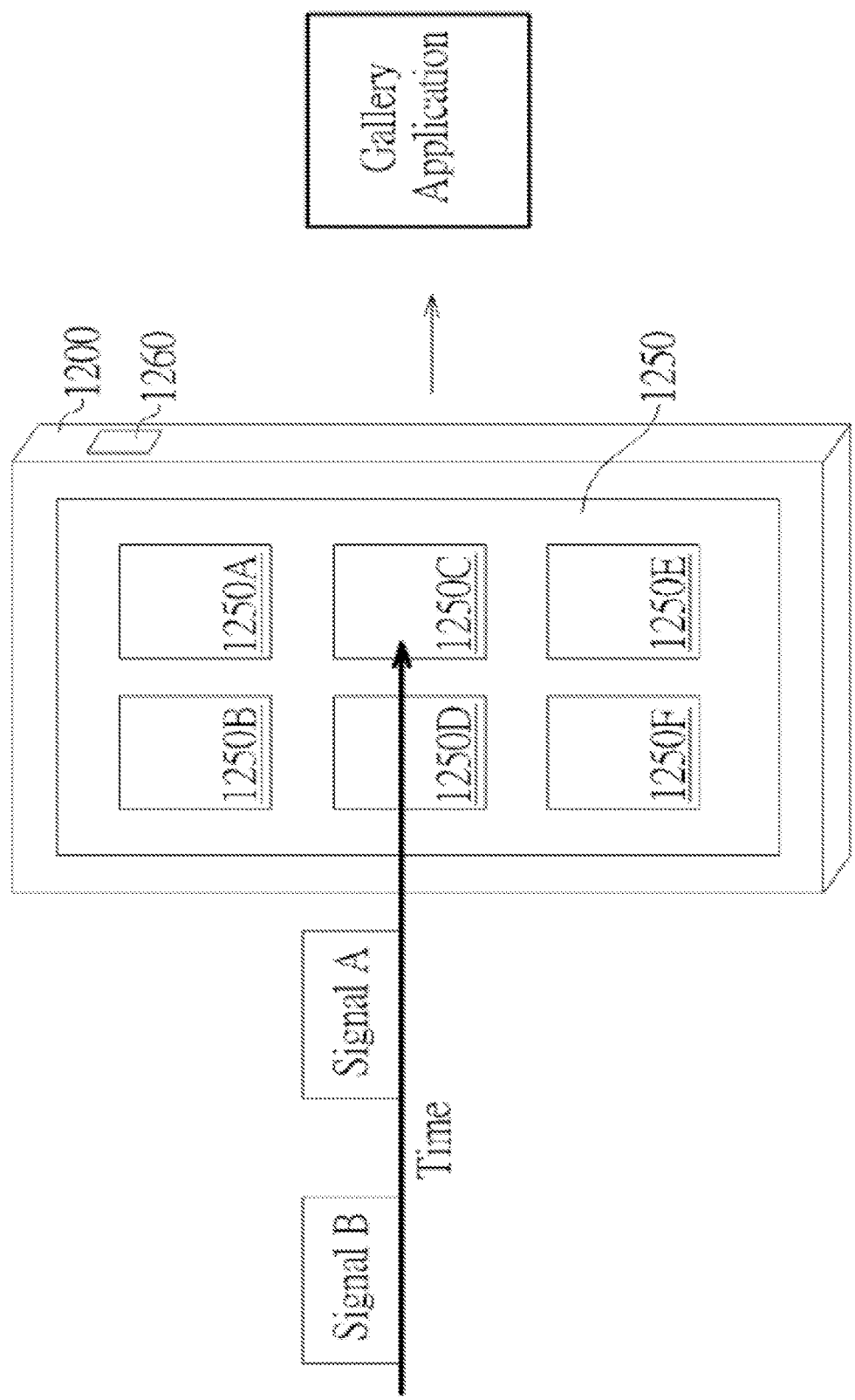
FIGS. 9-10 are diagrams illustrating signal receiving and action performing by a touch communications device according to exemplary embodiments of the present invention.
Figure 10:
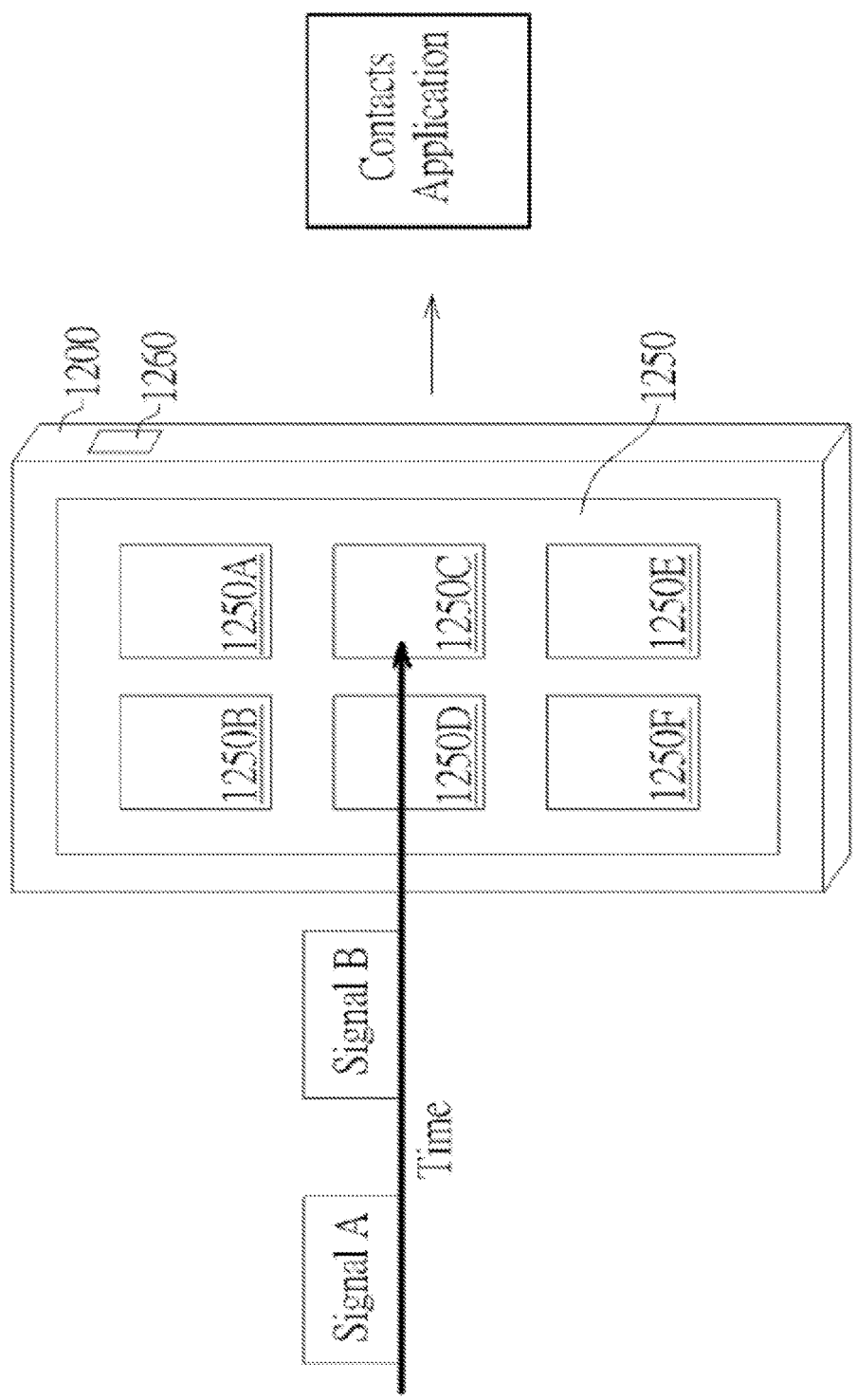

FIGS. 9 and 10 are diagrams illustrating signal receiving and action performing by the touch communications device 1200 according to exemplary embodiments of the present invention.

As shown in FIG. 9, an action may be performed, such as the gallery application may be enabled/initialized, based on the signal A and signal B sequentially received the region 1250C of the touch panel 1250. Further, as shown in FIG. 10, another action may be performed, such as the contacts application may be enabled/initialized, based on the signal A and signal B arranged in an inverse order compared with the order shown in FIG. 9. The actions can be performed by the processor 1260 has been described above and will not be repeated here.

Further, Different signal receiving sequences may trigger the same or different actions to be performed by processor 1260. For example, the receiving sequence signal C-signal D and signal D-signal C may both correspond to turning on TV or respectively correspond to turning on TV and enabling email application. Please note that the aforementioned signals, such as signals A-F, may be substantially the same as one another or different from one another. For example, the signal A and the signal B may be substantially the same, which may be deemed as a signal combination of signal A-signal A and thus corresponds to an action different from that corresponds to the signal combination signal A-signal C. In another exemplary embodiment, the signal A may be transmitted twice and thus triggers the processor 1260 to perform an action twice.

Figure 11:
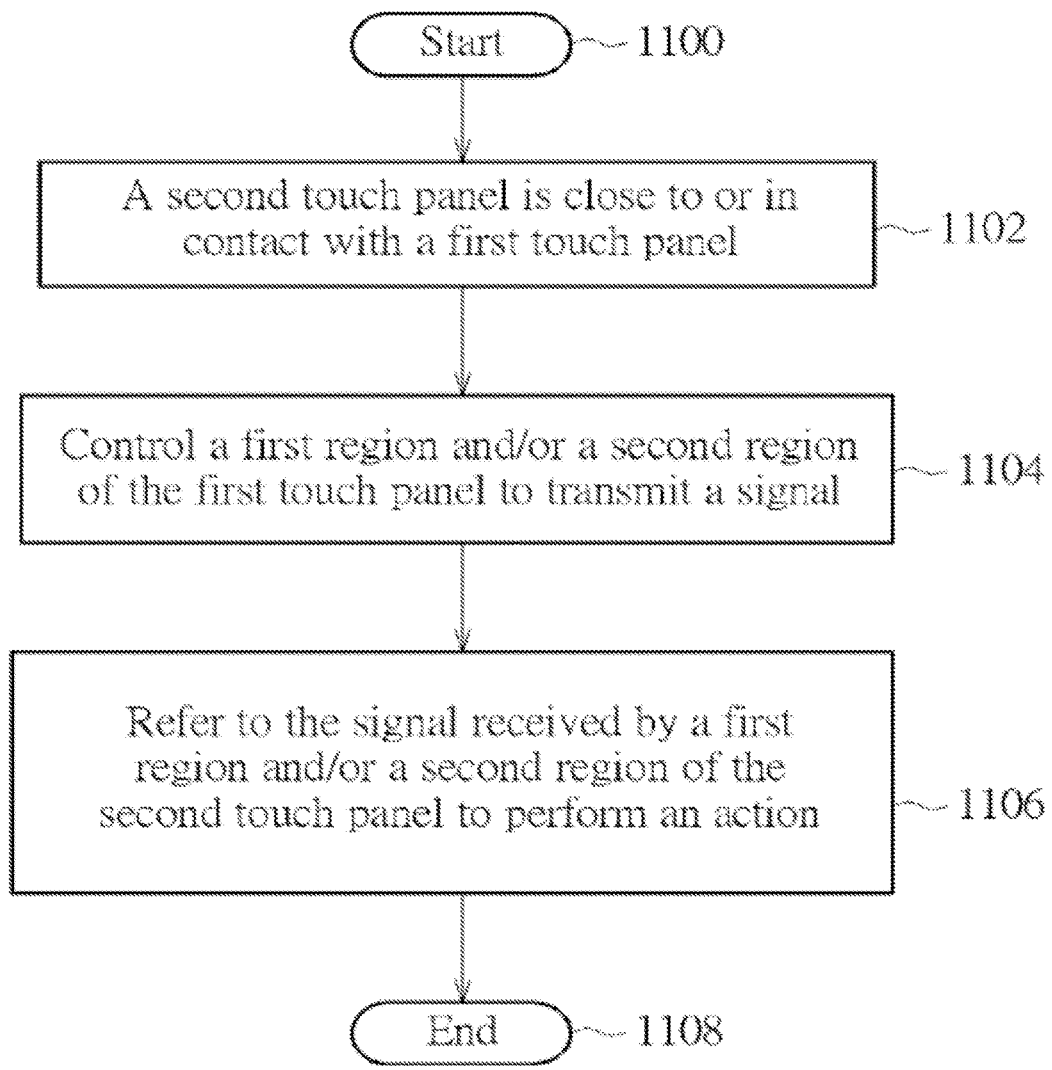
FIG. 11 is a touch communications method according to an exemplary embodiment of the present invention.

FIG. 11 is a touch communications method according to an exemplary embodiment of the present invention. Provided that the result is substantially the same, the steps are not required to be executed in the exact order shown in FIG. 11. Besides, one or more steps may be omitted. The touch communications method may be employed by the touch communications system 1000, and can be briefly summarized as below.

Step 1100: Start.

Step 1102: A second touch panel of a second touch communications device is placed to be close to or in contact with a first touch panel of a first touch communications device.

Step 1104: A processor of the first touch communications device is arranged to control a first region and/or a second region of the first touch panel to transmit a signal.

Step 1106: A processor of the second touch communications device is arranged to refer to the signal received by a first region and/or a second region of the second touch panel to perform an action.

Step 1108: End.

The above touch communications method illustrates a spatial-domain operation performed upon touch communications devices (e.g. transmitting signal combinations with different spatial arrangement). As one skilled in the art can understand details of each step after reading the above paragraphs directed to the touch communications system 1000, further description is omitted here for brevity.

Figure 12:
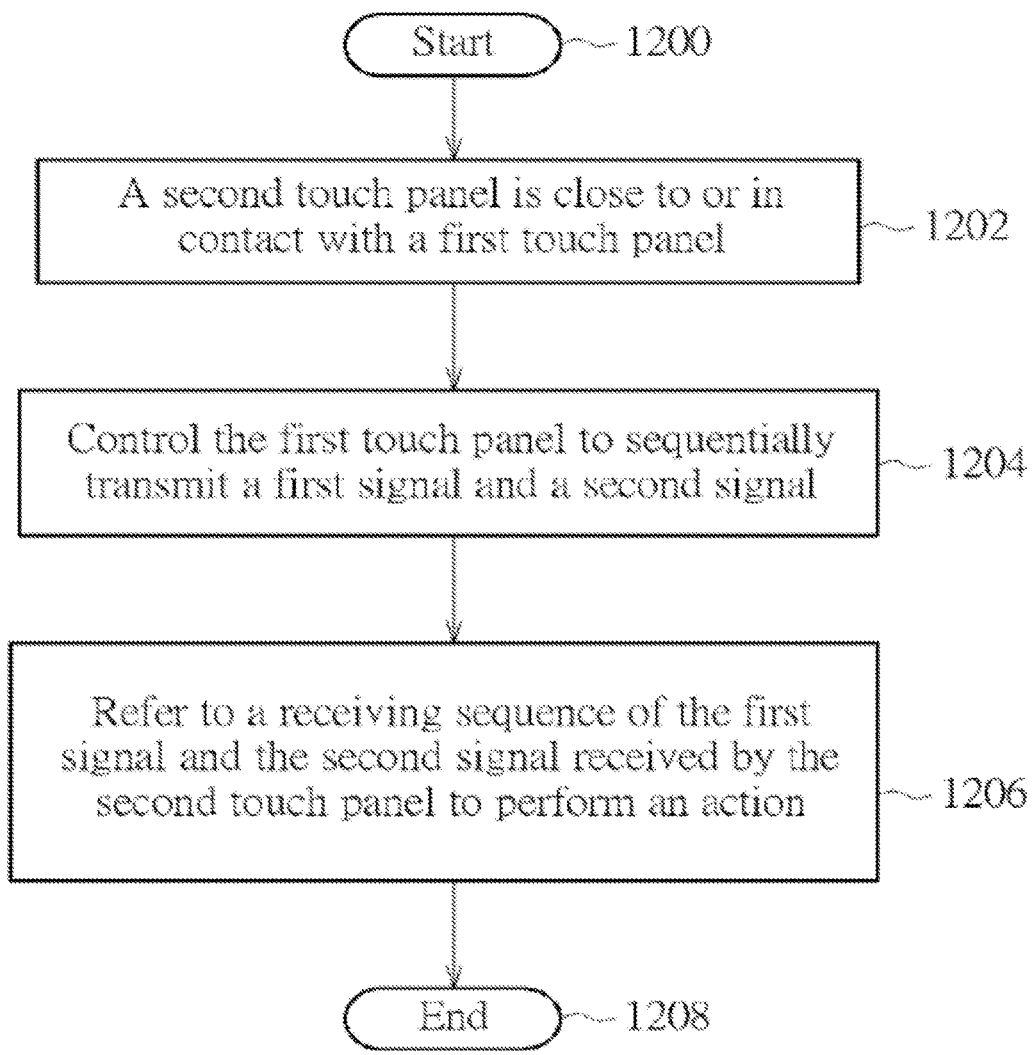
FIG. 12 is a touch communications method according to another exemplary embodiment of the present invention.

FIG. 12 is a touch communications method according to another exemplary embodiment of the present invention. Provided that the result is substantially the same, the steps are not required to be executed in the exact order shown in FIG. 12. Besides, one or more steps may be omitted. The touch communications method may be employed by the touch communications system 1000, and can be briefly summarized as below.

Step 1200: Start.

Step 1202: A second touch panel of a second touch communications device is placed to be close to or in contact with a first touch panel of a first touch communications device.

Step 1204: A processor of the first touch communications device is arranged to control the first touch panel to sequentially transmit a first signal and a second signal.

Step 1206: A processor of the second touch communications device is arranged to refer to a receiving sequence of the first signal and the second signal received by the second touch panel to perform an action.

Step 1208: End.

The above touch communications method illustrates a time-domain operation (e.g. transmitting signal combinations in different sequential orders). As one skilled in the art can understand details of each step after reading the above paragraphs directed to the touch communications system 1000, further description is omitted here for brevity.

Please note that although the operations of spatial-domain (e.g. transmitting signal combinations with different spatial arrangement), time-domain (e.g. transmitting signal combinations in different sequential orders), and frequency-domain (e.g. transmitting signals at different frequencies) are respectively illustrated above, one skilled in the art is readily to understand some or all of these operations can be combined based on actual design requirements. For example, two different sequences of signals can be received by two regions while the signals are at two different frequencies to form a signal combination. For example, signal A at frequency M and signal B at frequency N can be sequentially received by region 1250C while signal C at frequency N and signal D at frequency M are sequentially received by region 1250F.

Besides, in some exemplary embodiments, the first touch communications device 1100 may execute a first program to generate and transmit the signal(s), while the second touch communications device 1200 may execute a second program based on the received signal(s). The first program and the second program may be the same or different.

It should be noted that the touch panel mentioned in the exemplary embodiments above can be a touch panel that does not have the display functionality (e.g. a touch pad), or a touch panel that has the display functionality (e.g. a touch screen). Besides, a first touch panel of a first touch communications device is close to or in contact with a second touch panel of a second touch communications device can mean that the distance between the first touch panel and the second touch panel is not larger than a predetermined distance. For example, if the predetermined distance is 2 cm, the first touch panel is close to or in contact with the second touch panel can mean that the distance between the first touch panel and the second touch panel is not larger than 2 cm. This is for illustrative purpose only, but not a limitation. The predetermined distance may vary with the touch panel, its driving IC, and the design of the electronic device, and may be greater, such as 5 cm, or may be less, such as 2 mm, and so on.

To summarize, the second touch communications device may perform different actions based on different signals or signal combinations transmitted by the first touch communications device and received by the second touch communications device. The signals or signal combinations may vary in spatial-domain, time domain, frequency-domain, or a combination thereof. Therefore, a more versatile method of triggering actions to be performed is obtained.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A touch communications device, comprising:
   a first touch panel, comprising a first region, arranged to establish a communications connection with another touch communications device when a second touch panel of the another touch communications device is close to or in contact with the first touch panel; and
   a processor, arranged to control the first region to transmit a first signal and a second signal sequentially, in a first sequence and a second sequence different from the first sequence, to a second region of the second touch panel of the another touch communications device, after the first touch panel has established the communications connection,
   wherein the first signal and the second signal are in different frequencies,
   wherein, in the first sequence, the first signal is transmitted first followed by the second signal from the first region of the first touch panel to the second region of the second touch panel, and
   wherein, in the second sequence, the second signal is transmitted first followed by the first signal from the first region of the first touch panel to the second region of the second touch panel.

2. The touch communications device of claim 1, wherein the first signal is transmitted at a first frequency and the second signal is transmitted at a second frequency different from the first frequency.

3. The touch communications device of claim 1, wherein the first signal and the second signal enable the another touch communications device to perform a first action in response to the first signal and the second signal being transmitted in the first sequence, and wherein the first signal and the second signal enable the another touch communications device to perform a second action different from the first action in response to the first signal and the second signal being transmitted in the second sequence.

4. The touch communications device of claim 1, wherein the first region and the second region are a same region.

5. A touch communications device, comprising:
   a first touch panel, comprising a first region, arranged to establish a communications connection with another touch communications device when a second touch panel of the another touch communications device is close to or in contact with the first touch panel; and
   a processor, arranged to refer to a first sequence and a second sequence of a first signal and a second signal received by the first region from a second region of the second touch panel, after the first touch panel has established the communications connection, to perform a first action in response to the first signal and the second signal being received sequentially in the first sequence and to perform a second action different from the first action in response to the first signal and the second signal being received sequentially in the second sequence,
   wherein the first signal and the second signal are in different frequencies,
   wherein, in the first sequence, the first signal is transmitted first followed by the second signal from the first region of the first touch panel to the second region of the second touch panel, and
   wherein, in the second sequence, the second signal is transmitted first followed by the first signal from the first region of the first touch panel to the second region of the second touch panel.

6. The touch communications device of claim 5, wherein the first signal is transmitted at a first frequency and the second signal is transmitted at a second frequency different from the first frequency by the second touch panel of the another touch communications device.

7. The touch communications device of claim 5, wherein the first region and the second region are a same region.

8. A touch communications device, comprising:
   a first touch panel, arranged to establish a communications connection with another touch communications device when a second touch panel of the another touch communications device is close to or in contact with the first touch panel; and
   a processor, arranged to control the first touch panel to sequentially transmit a first signal and a second signal in different frequencies, different temporal sequences, or a combination of the different frequencies and the different temporal sequences, after the first touch panel has established the communications connection, wherein each of the different frequencies, different temporal sequences, or the combination of the different frequencies and the different temporal sequences enables the another touch communication device to perform a respective action of a plurality of actions.

9. A touch communications device, comprising:
   a first touch panel, arranged to establish a communications connection with another touch communications device when a second touch panel of the another touch communications device is close to or in contact with the first touch panel; and a processor, arranged to refer to a receiving of a first signal and a second signal in different frequencies, different temporal sequences, or a combination of the different frequencies and the different temporal sequences, by the first touch panel, after the first touch panel has established the communications connection, to perform a respective action of a plurality of actions corresponding to each of the different frequencies, different temporal sequences, or the combination of the different frequencies and the different temporal sequences.

10. The touch communications device of claim 9, wherein the first signal is transmitted at a first frequency and the second signal is transmitted at a second frequency different from the first frequency by the second touch panel of the another touch communications device.

11. The touch communications device of claim 9, wherein the processor enables a first application when the first signal is received before the second signal is received.

12. The touch communications device of claim 11, wherein the processor enables a second application when the first signal is received after the second signal is received.

13. A touch communications device, comprising:

a first touch panel, arranged to establish a communications connection with another touch communications device when a second touch panel of the another touch communications device is close to or in contact with the first touch panel; and a processor, wherein the first touch panel comprises a first region and a second region, and wherein the processor refers to a receiving sequence of a first signal and a second signal received sequentially by the first region and another receiving sequence of a third signal and a fourth signal received sequentially by the second region, to perform an action according to the receiving sequence and the another receiving sequence, wherein the processor enables a first application when the first signal is before the second signal in the receiving sequence, wherein the processor enables a second application when the first signal is after the second signal in the receiving sequence, and wherein the processor enables a third application when the first signal is before the second signal in the receiving sequence and the third signal is before the fourth signal in the another receiving sequence.

* * * * *